United States Patent [19]
Saito

[11] Patent Number: 5,822,104
[45] Date of Patent: Oct. 13, 1998

[54] DIGITAL OPTICAL RECEIVING APPARATUS

[75] Inventor: Tomoki Saito, Tokyo, Japan

[73] Assignee: NEC Corporation, Tokyo, Japan

[21] Appl. No.: 606,377

[22] Filed: Feb. 23, 1996

[30]    Foreign Application Priority Data

Feb. 24, 1995  [JP]  Japan ................................ 7-036722

[51] Int. Cl.$^6$ ................................................. H04B 10/06
[52] U.S. Cl. .......................... 359/189; 375/318; 330/252
[58] Field of Search ................................. 359/189, 193, 359/195; 375/316, 318, 340; 330/252, 261

[56]            References Cited

U.S. PATENT DOCUMENTS

| | | | |
|---|---|---|---|
| 4,236,256 | 11/1980 | Brackett et al. ...................... | 359/189 |
| 5,371,763 | 12/1994 | Ota et al. .............................. | 375/76 |
| 5,430,765 | 7/1995 | Nagahori .............................. | 375/318 |
| 5,430,766 | 7/1995 | Ota et al. .............................. | 375/318 |
| 5,499,244 | 3/1996 | Mosch et al. ........................ | 370/94.1 |

FOREIGN PATENT DOCUMENTS 5-227104  3/1993  Japan .

*Primary Examiner*—Rafael Bacares
*Attorney, Agent, or Firm*—Scully, Scott, Murphy & Presser

[57]          ABSTRACT

An output signal of an opto-electric conversion element 1 is amplified by a differential type pre-amplifier 3 to a predetermined level and input to an ATC circuit 5 as a positive phase signal and an inverted phase signal. These signals are held in respective peak holding circuits 51 and 52 of the ATC circuit 5. The positive phase signal held in the peak holding circuit 51 is added by an adder 57 to the inverted phase signal from the pre-amplifier 3 and the inverted phase signal held in the peak holding circuit 52 is added by an adder 58 to the positive phase signal from the pre-amplifier 3. Resultant sum signals are compared by a comparator 7 with a reference and discriminated as logical "1" and "0". The positive phase signal from the pre-amplifier 3 is input to a self-reset circuit 9 including a level detector 91, a reset pulse generator and a reset circuit 93. The level detector 91 detects a signal from the pre-amplifier 3. The reset pulse generator 92 generates a reset signal in the form of a single pulse by using an output of the level detector 91. The reset circuit 93 uses the reset signal to discharge a holding capacitor of the peak holding circuit 52. Degradation of duty cycle and of signal amplitude due to offset of an input signal can be minimized.

12 Claims, 7 Drawing Sheets

DIGITAL OPTICAL RECEIVING APPARATUS

BACKGROUND OF THE INVENTION

1. Field of the Invention

The present invention relates to a digital optical receiving apparatus. In particular, the present invention relates to a digital optical receiving apparatus applicable to a burst signal transmission in a passive optical network (PON), an optical transmission system or an optical EATHERNET communication system.

2. Description of Related Art

In general, in the PON optical transmission system, etc., a signal propagating along a transmission path takes in the form of burst. Therefore, an optical receiving apparatus which receives an arbitrary signal pattern is of a DC coupling type. Japanese Patent Application No. Hei 6-217404 (filed on Sep. 12, 1994) discloses an example of a conventional DC coupling type optical receiving apparatus.

It is general that, when an optical signal including a constant offset is input to an opto-electric conversion element of an optical receiving apparatus, a current is supplied to the opto-electric conversion element in a direction for removing the offset. Japanese Patent Laid Open Publication No. Hei 5(1993)-227104 discloses an example of a circuit construction of the optical receiving apparatus with which a signal having no offset is output from an opto-electric conversion element.

In such conventional optical receiving apparatus, however, there may be a case where an optical signal having a waveform containing a light component having a level which is not completely zero level and a light component having a level not lower than a predetermined level is input. Such offset optical signal waveform whose its low level does not become zero level is produced when the optical extinction ratio of the signal is degraded for such reason that a semiconductor laser as a transmission light source is preliminarily biased in order to reduce a delay of light emission thereof. Emission of light whose optical extinction ratio is degraded is cut off on a transmitter side in time periods other than a burst signal period such that such light emission does not affect other burst signals.

When the optical signal waveform having offset due to degradation of extinction ratio is input to an optical receiving apparatus, there may be an error in duty cycle of its waveform. That is, in general, the optical receiving apparatus detects a high level and a low level of the received optical signal and obtains an optical receiving signal waveform using an intermediate level between the high and low levels of the received signal as a reference. However, when the optical receiving signal in low level is not completely in zero level, the above-mentioned reference is deviated. When the duty cycle of the waveform is determined by using the deviated reference, there may be a case where the duty cycle detected is large in appearance.

In the optical receiving circuit disclosed in Japanese Patent Application No. Hei 6-217404, a positive output signal and an negative phase output signal of an automatic threshold level control (ATC) circuit thereof become unbalanced in level. As a result, an amplitude of the output signal from the ATC circuit is reduced and thus a discriminating value is changed. The change of discriminating value causes the duty cycle of an output signal waveform of a comparator of the ATC circuit to be degraded.

Further, the degradation of duty cycle causes a data discriminating margin to be substantially degraded particularly when the receiving signal level is low. The degradation of data discriminating margin causes a minimum optical receiving level of the receiving circuit to be degraded.

Further, the reduction of the output signal amplitude of the ATC circuit leads to degradation of the minimum optical receiving level and reduction of dynamic range of the receiving circuit. The reduction of dynamic range results in a reduction of a system margin.

In addition, it is general, in an optical receiving apparatus handling burst data, that an operation timing for achieving a high speed pull-in is extracted from an information of both a rising edge and a falling edge of the data. Therefore, when the duty cycle varies, a jitter of an extracted clock is increased and the pull-in characteristics is degraded.

SUMMARY OF THE INVENTION

An object of the present invention is to provide a digital optical receiving circuit with which a duty cycle variation of an output waveform of the circuit due to offset of an input signal and a degradation of signal amplitude can be minimized.

A digital optical receiving circuit according to the present invention comprises an opto-electric conversion element for converting an optical signal into an electric signal and a differential type pre-amplifier for amplifying the electric signal from the opto-electric conversion element to a predetermined level and outputting it as a first signal and a second signal. The digital optical receiving circuit further comprises an automatic threshold control circuit for producing a first logical decision signal and a second logical decision signal which have an intermediate value between values of the first and second signals output from the differential type pre-amplifier, a comparator for producing a logic signal on the basis of the first and second logical decision signals output from the automatic threshold control circuit and a self-reset circuit for resetting a peak holding capacitor of the automatic threshold control circuit, which holds a peak value of the first or second signal.

According to the digital optical receiving circuit of the present invention, when the self-reset circuit detects that a level of the first or second signal output from the differential type pre-amplifier becomes equal to or higher than a predetermined level above an optical zero level, the self-reset circuit outputs a reset signal to reset the peak holding capacitor of the automatic threshold control circuit, so that the zero level of the offset optical signal is exactly held to thereby obtain an exact logic signal.

Further, in the digital optical receiving circuit of the present invention, the automatic threshold control circuit comprises a first peak holding circuit for holding a peak value of the first signal of positive phase output from the differential type pre-amplifier, a second peak holding circuit for holding a peak value of the second signal of inverted phase output from the differential pre-amplifier, a first adder for producing a first logical decision signal by adding the first signal of positive phase from the differential pre-amplifier and an output signal of the second peak holding circuit and a second adder for producing a second logical decision signal by adding the second signal of inverted phase from the differential type pre-amplifier and an output signal of the first peak holding circuit.

The automatic threshold control circuit produces the first logical decision signal from the peak value of the signal from the second peak holding circuit and the first signal and the second logical decision signal from the peak value of the output signal of the first peak holding circuit and the second signal.

The self-reset circuit includes a level detector, a reset pulse generator and a reset circuit. The level detector detects at least one of the first and second signals output from the differential type pre-amplifier which is equal to or higher than a predetermined level. Further, the self-reset circuit generates the reset pulse on the basis of the output signal of the level detector. The self-reset circuit outputs the reset signal for resetting the second peak holding circuit in the automatic threshold control circuit in order to hold the zero level of the optical signal when the output signal of the differential type pre-amplifier is equal to or higher than a certain constant level. With the second peak holding circuit being reset, the latter circuit becomes ready for operation. The reset circuit discharges the capacitor of the second peak holding circuit in the automatic threshold control circuit on the basis of the output signal of the reset pulse generator.

In another aspect of the present invention, the digital optical receiving circuit comprises an opto-electric conversion element, a differential type preamplifier, a first peak holding circuit, a second peak holding circuit, a first adder, a second adder, an automatic threshold control circuit, a comparator, a level detector, a reset pulse generator and a self-reset circuit.

The differential type pre-amplifier amplifies an electric signal from the opto-electric conversion element to a predetermined level and outputting it as a first signal and a second signal. The first peak holding circuit holds a peak value of the first signal from the differential type pre-amplifier. The second peak holding circuit holds a peak value of the second signal from the differential pre-amplifier.

The first adder produces a first logical decision signal by adding the first signal from the differential pre-amplifier and an output signal of the second peak holding circuit. The second adder produces a second logical decision signal by adding the second signal from the differential type pre-amplifier and an output signal of the first peak holding circuit. The automatic threshold control circuit is composed of the first and second peak holding circuits and the first and second adders. The comparator produces a logic signal on the basis of the first and second logical decision signals from the automatic threshold control circuit. The level detector determines whether or not at least one of the first and second signals from the differential type pre-amplifier exceeds a predetermined value.

The reset pulse generator generates a reset pulse on the basis of an output of the level detector. The self-reset circuit includes a reset circuit for discharging the holding capacitor of the second peak holding circuit by the reset pulse from the reset pulse generator.

According to the digital optical receiving circuit of the present invention, the self-reset circuit detects that the first or second signal from the differential type pre-amplifier becomes equal to or higher than a certain constant level. When it is equal to or higher, the self-reset circuit generates the reset signal to reset the peak holding capacitor in the automatic threshold control circuit to thereby hold the zero level of the offset optical signal, resulting in an exact logic signal.

In the digital optical receiving circuit of the present invention, the first adder includes a first resistor having one end connected to the output of the second peak holding circuit and a second resistor having one end connected to one of output terminals of the differential type pre-amplifier. The other ends of the first and second resistors are connected commonly to one of input terminals of the comparator. The second adder includes a third resistor having one end connected to the output of the first peak holding circuit and a fourth resistor having one end connected to the other output terminal of the differential pre-amplifier. The other ends of the third and fourth resistors are commonly connected to the other input terminal of the comparator.

With the above construction of the first and second adders, two signals on each of the first discriminating signal side and the second discriminating signal side are added through the resistors.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

In order to facilitate understanding of the present invention, a construction of a conventional digital optical receiving circuit will be described first.

Figure 1:
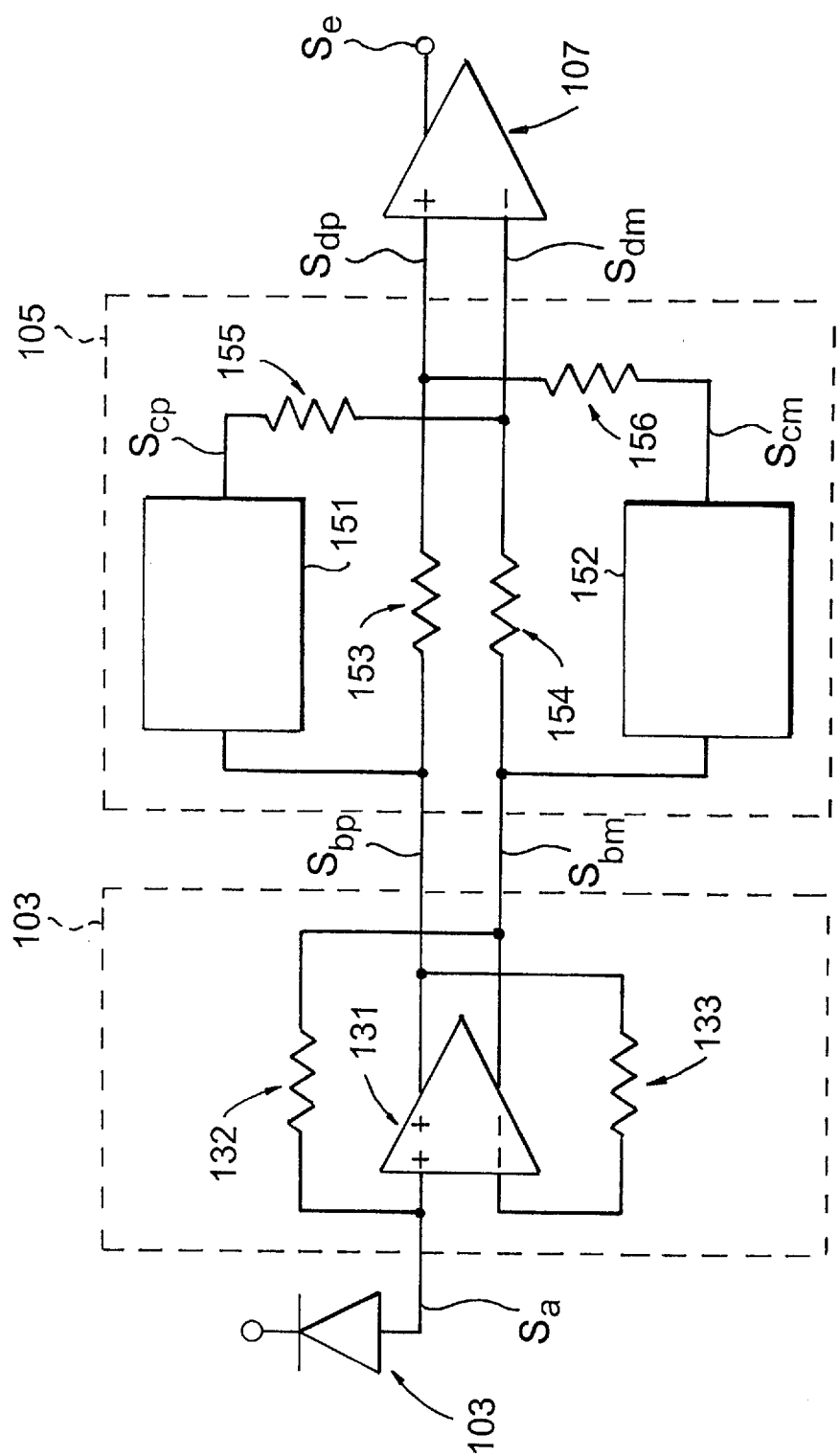
FIG. 1 is a block diagram showing an example of construction of a conventional digital optical receiving circuit.

In a conventional optical receiving circuit of the DC coupling type shown in FIG. 1, an anode of an opto-electric conversion element 101 is connected to a preamplifier 103 and a cathode thereof is connected to a bias source. The amplifier 103 is constructed with a differential amplifier 131 and resistors 132 and 133. An output of the amplifier 103 is connected to an input terminal of an automatic threshold control (ATC) circuit 105. The automatic threshold control circuit 105 is constructed with a first peak holding circuit 151, a second peak holding circuit 152 and resistors 153, 154, 155 and 156. An output of the ATC circuit 105 is connected to one of input terminals of a comparator 107.

An operation of this optical receiving circuit will be described with reference to FIGS. 1 to 3.

Figure 2:
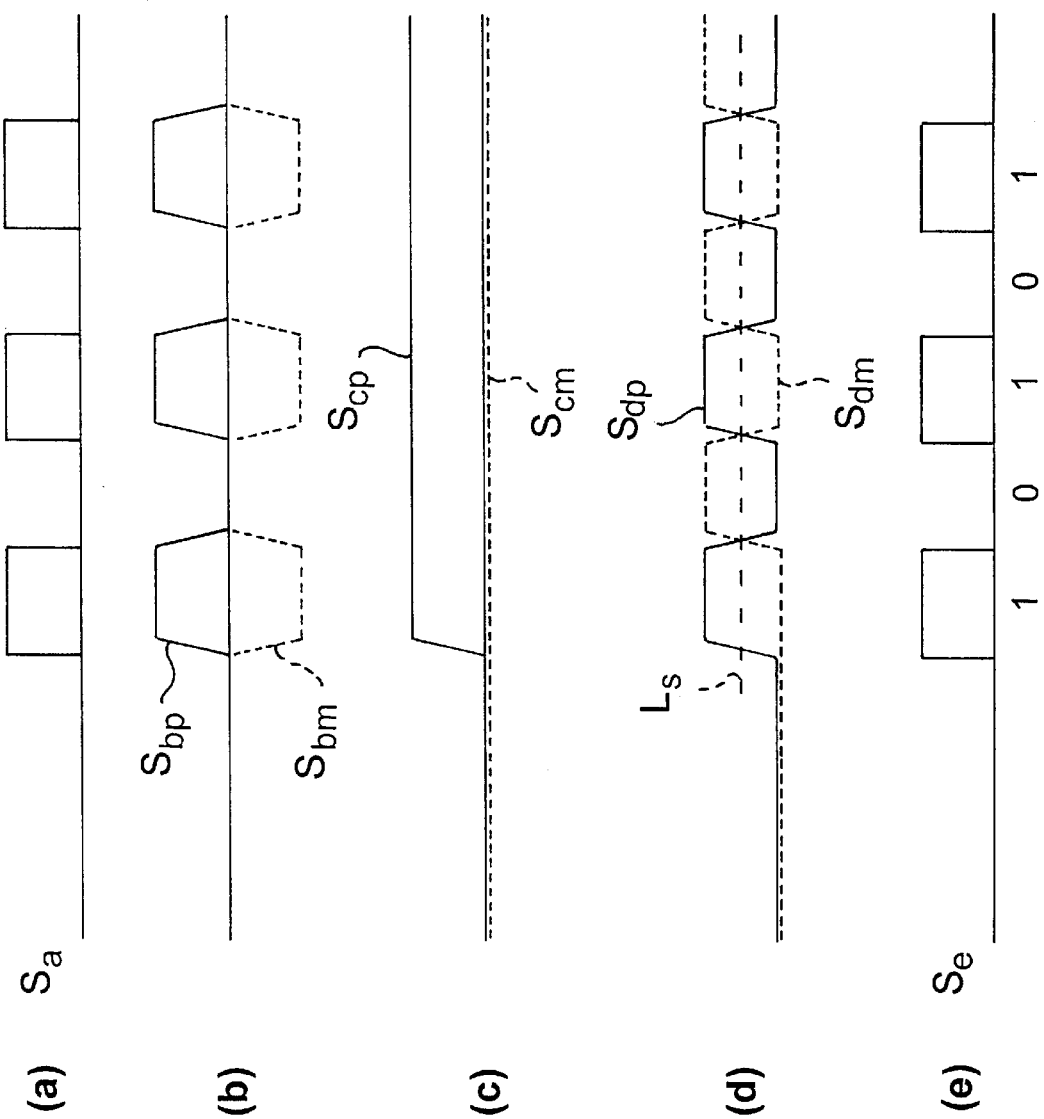
FIG. 2 is a timing chart for explaining a basic function of the conventional digital optical receiving circuit.
Figure 3:
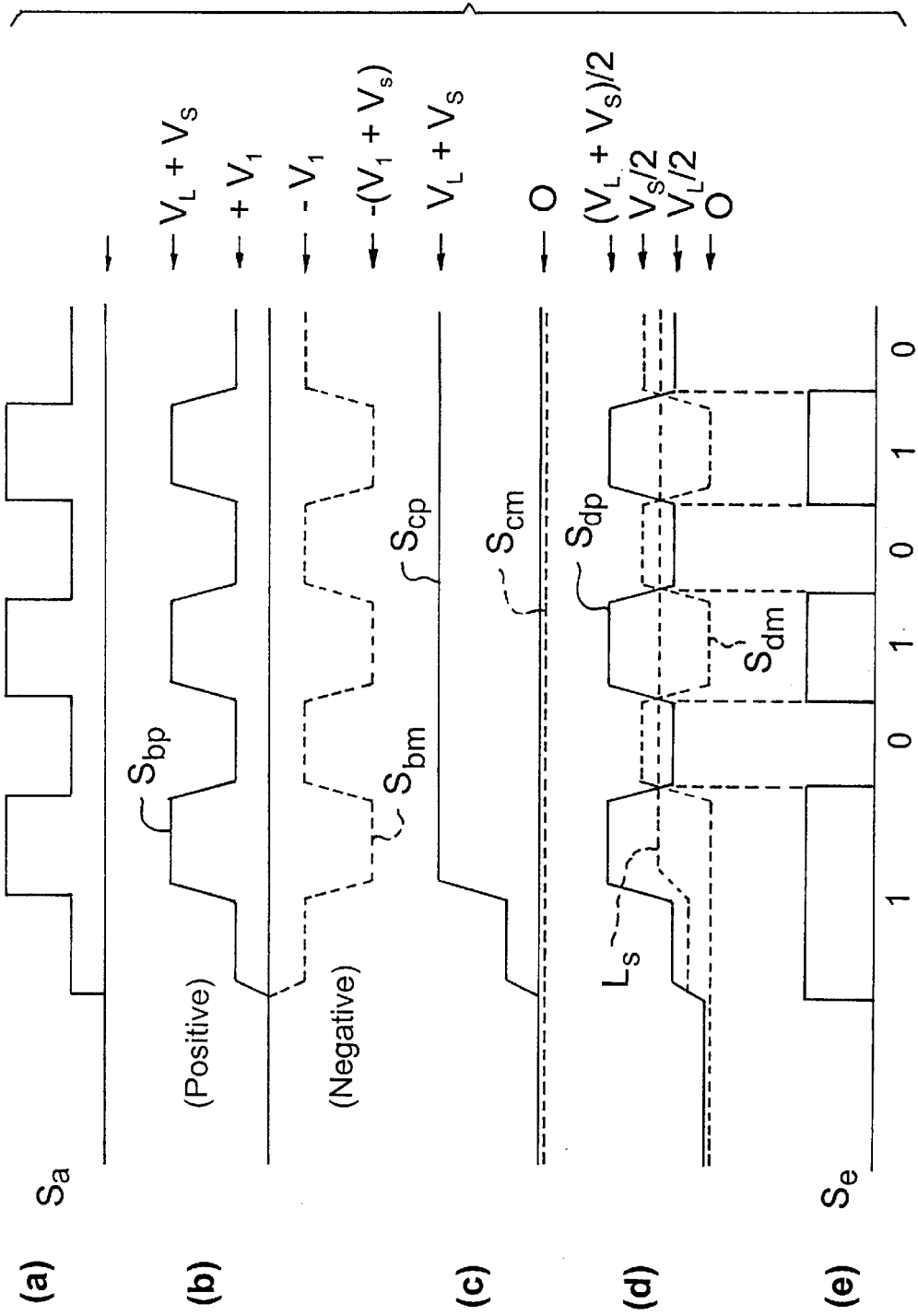
FIG. 3 is a timing chart showing an operation of the conventional digital optical receiving circuit.

FIG. 2 is a time chart showing a normal operation of the optical receiving circuit and FIG. 3 is a time chart showing an abnormal operation of the optical receiving circuit. In these figures, abscissa is a time axis and (a) shows a burst signal, (b) an output waveform of the pre-amplifier, (c) an output waveform of the peak holding circuit and (e) input and output signal waveforms of the comparator, respectively. First, it is assumed that the optical receiving circuit is in a signal waiting state in which peak holding capacitors of the peak holding circuits 151 and 152 are discharged. In such state, when a optical burst signal having a level in which there is completely no light and a level in which there is an optical level equal to or higher than a predetermined level is input to the opto-electric conversion element 101, the optical signal is converted into an electric signal $S_a$ as shown in FIG. 2(a). This signal $S_a$ is input to the pre-amplifier 103 of transimpedance type. The pre-amplifier 103 composed of the differential amplifier 131 and the resistors 132 and 133 outputs differential signals $S_{bp}$ and $S_{bm}$ having positive and negative polarities as shown in FIG. 2(b). The differential signals $S_{bp}$ and $S_{bm}$ are input to the ATC circuit 105 composed of the peak holding circuits 151 and 152 and the adders composed of the resistors 152 to 156. The signals $S_{bp}$ and $S_{bm}$ are produced such that a discriminating value $L_s$ used in the ATC circuit 105 to discriminate between a logic "1" and a logic "0" is set to an intermediate value between the signals $S_{dp}$ and $S_{dm}$. The output signals $S_{dp}$ and $S_{dm}$ of the ATC circuit 105 which are shown in FIG. 2(d) are supplied to the comparator 107. In the comparator 107, these signals are converted into a signal $S_e$ composed of logic values "1" and "0" shown in FIG. 2(e).

Now, an operation of the conventional optical receiving circuit when an optical burst signal having a level in which there is completely no light and a level in which there is an optical level equal to or higher than a predetermined level is input to the conventional optical receiving circuit as shown in FIG. 3(a) will be described. This optical signal has a waveform having optical quenching ratio degraded for the reason of preliminary biasing of a semiconductor laser as a transmission light source to reduce delay of light emission of the semiconductor laser. Light emission due to degradation of optical quenching ratio is cut off on a transmitter side in time periods other than a burst signal period such that such light emission does not affect other burst signals.

When the signal waveform (FIG. 3(a)) having an offset due to degradation of optical quenching ratio is input to the opto-electric conversion element 101, it is converted into an electric signal Sa which is input to the pre-amplifier 103. In the pre-amplifier 103, a constant bias voltage $V_L$ is added in both positive and negative directions by offset as shown in FIG. 3(b), resulting in the differential signals $S_{bp}$ and S$bm$ which have values ($V_L+V_S$) in both positive and negative directions when the logic "1". When this signal is input to the ATC circuit 105, the peak holding circuit 152 can not hold a level ($-V_L$) corresponding to the logic "0" of the second signal $S_{bm}$ of the pre-amplifier 103 exactly. Therefore, the peak holding circuit 152 continues to hold the value in the signal waiting state before the burst signal arrives thereat. The output of the ATC circuit 105 becomes a signal $S_{dp}$ whose level on the positive phase side varies between ($V_L+V_S$)/2 and ($V_L$/2) and a signal $S_{dm}$ whose level on the inverted phase side varies between ($V_s$)/2 and (0) as shown in FIG. 3(d) and thus the positive phase output $S_{dp}$ and the inverted phase output $S_{dm}$ become unbalanced in level.

The comparator 107 outputs the signal $S_e$ having a different duty cycle and composed of logic values "0" and logic values "1". As a result, the amplitude of the output signal (logical decision signal) of the ATC circuit 105 is reduced.

In general, when an optical signal having an offset such as shown in FIG. 3(a), a current flows through the opto-electric conversion element in a direction in which the offset is cancelled. However, in the conventional optical receiving circuit, the offset shown in FIG. 3(a) with which the quenching ratio is degraded can not be cancelled as shown in FIG. 3(d) and the positive phase output signal $S_{dp}$ and the inverted phase signal $S_{dm}$ of the output of the ATC circuit 105 are unbalanced in level. As a result, the duty cycle of the waveform of the output signal S of the comparator 109 is degraded. Thus, the amplitudes of the output signals $S_{dp}$ and $S_{dm}$ of the ATC circuit 105 are reduced and the discriminating value $L_S$ is changed.

This degradation of the duty cycle causes the data discriminating margin to be degraded particularly when the receiving signal level is low. With such degraded margin of the data discrimination, the minimum light receiving level of the receiving circuit is degraded. In addition thereto, the conventional optical receiving apparatus handling a burst data generally extracts, in order to achieve the high speed pull-in operation, the operation timing on the basis of information of both the rising edge and the falling edge of the data. Therefore, when the duty cycle is varied, the jitter of the extracted clock may be increased and the pull-in characteristics may be degraded.

The reduction of the output signal amplitude leads to a reduction of the minimum light receiving level and a reduction of the dynamic range. The reduction of dynamic range leads to a reduction of the system margin.

A digital optical receiving circuit of the present invention, which solves the above-mentioned problems, will be described in detail.

Figure 4:
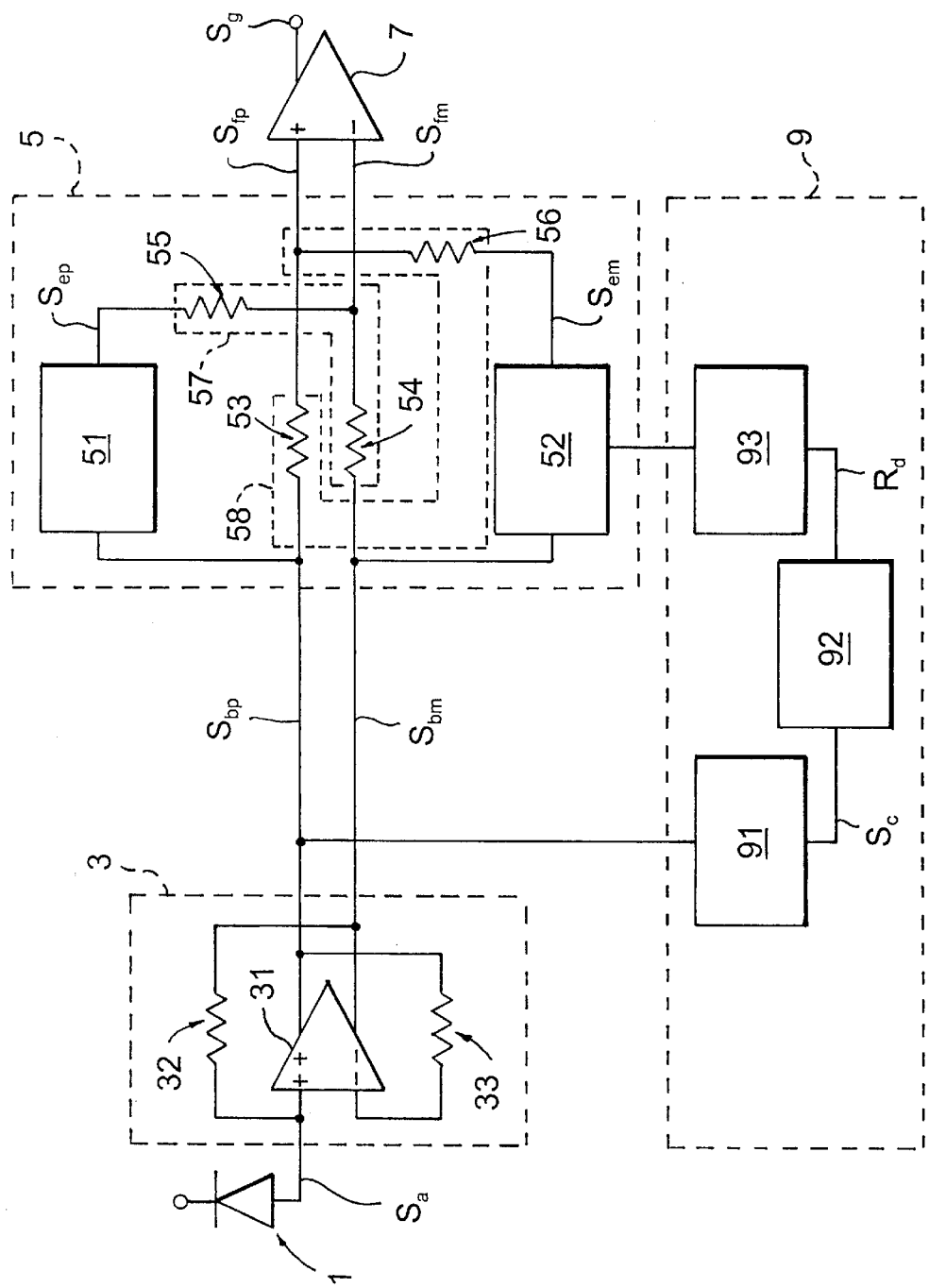
FIG. 4 is a block diagram showing an embodiment of a digital optical receiving circuit according to the present invention.

FIG. 4 shows, in a block form, a construction of an embodiment of the digital optical receiving circuit of the present invention. In order to receive an optical signal having an arbitrary signal pattern, respective components of the digital optical receiving circuit of the present invention are DC-coupled to each other.

The digital optical receiving circuit of the present invention is generally constructed with an opto-electric conversion element 1, a differential type pre-amplifier 3, an automatic threshold control (ATC) circuit 5, a comparator 7 and a self-reset circuit 9.

In detail, an anode of the opto-electric conversion element 1 is connected to the pre-amplifier 3 and a cathode thereof is connected to a bias source which is not shown. The pre-amplifier 3 is a transimpedance type differential amplifier composed of a differential amplifier 31 and feedback resistors 32 and 33. A positive phase output of the differential amplifier 31 is fed back to an inverted phase input thereof through the feedback resistor 33. On the other hand, an inverted phase output of the differential amplifier 31 is fed back to a positive phase input thereof through the feedback resistor 32. A first and second signals Sbp and Sbm from the pre-amplifier 3 are supplied to respective input terminals of the ATC circuit 5. The first signal is also supplied to the self-reset circuit 9.

The ATC circuit 5 is constructed with a first peak holding circuit 51, a second peak holding circuit 52, a first adder circuit 58 composed of resistors 53 and 56 and a second adder circuit 57 composed of resistors 54 and 55. In the ATC circuit 5, a logic decision signal for deciding a logic "1" or "0" can be set to an intermediate value of the amplitudes of the first and second output signals of the pre-amplifier 3. A positive phase output (first logical decision signal) of the ATC circuit 5 is obtained as a sum of the positive phase output of the pre-amplifier 3 and an output of the second peak holding circuit 52 which holds a peak value of the inverted phase output of the pre-amplifier 3. An inverted phase output of the ATC circuit 5 is obtained as a sum of the inverted phase output of the pre-amplifier 3 and an output of the first peak holding circuit 51 which holds a peak value of the positive phase output of the pre-amplifier 3.

The respective outputs of the ATC circuit 5 are supplied to respective input terminals of the comparator circuit 7.

The self-reset circuit 9 is constructed with a level detector 91 for detecting a signal in the output of the pre-amplifier 3, a reset pulse generator circuit 92 for generating a single pulse, reset signal in response to the signal detected by the level detector circuit 91 and a reset circuit 93 for discharging a hold capacitor of the second peak holding circuit 52 in response to the reset signal.

Figure 5:
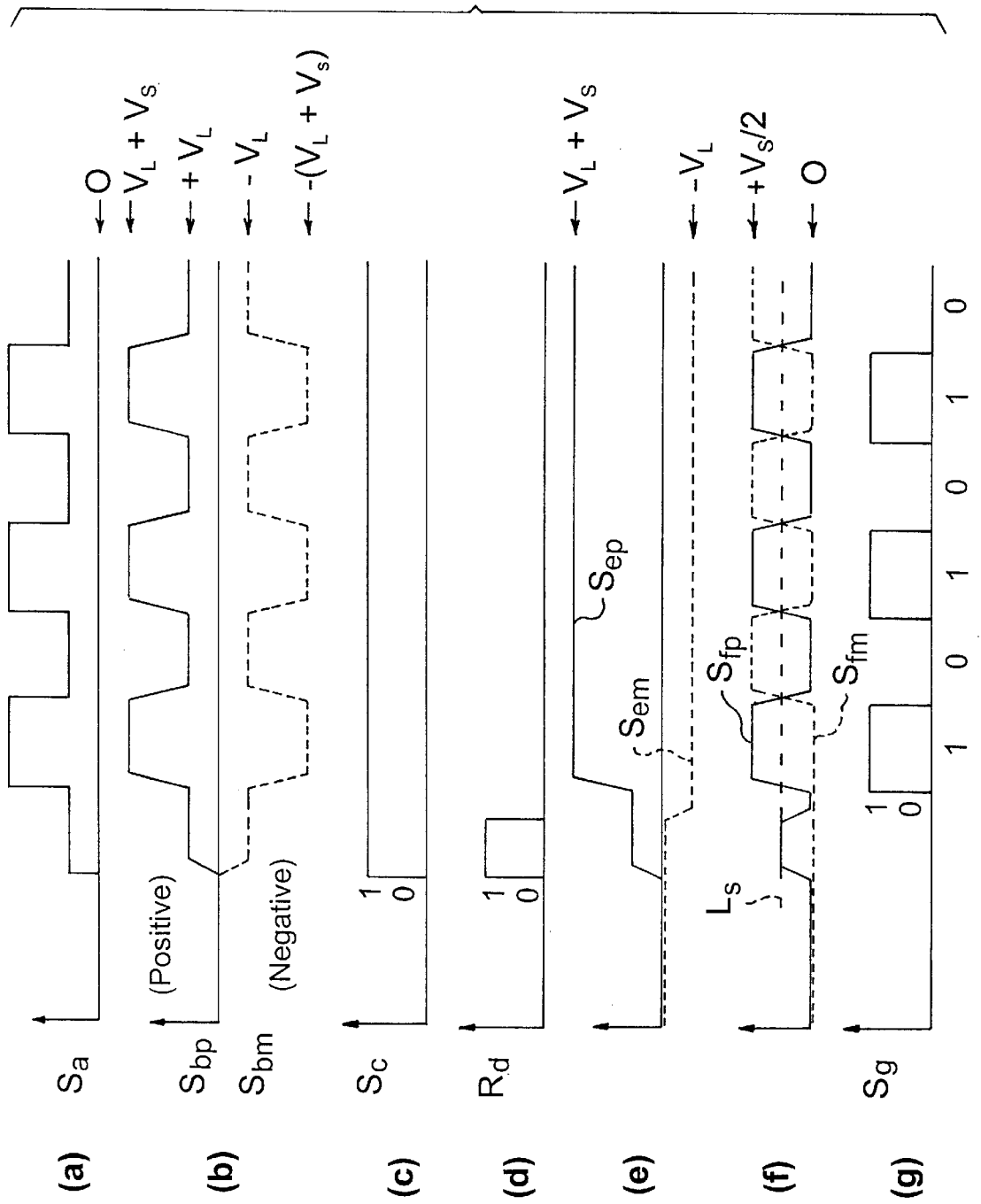
FIG. 5 is a timing chart showing an operation timing of the digital optical receiving circuit according to the present invention.

Now, an operation of the above-mentioned digital optical receiving circuit according to the present invention will be described with reference to FIG. 4 and a timing chart of the operation shown in FIGS. 5(a) to 5(g) having abscissa commonly showing time, in which FIG. 5(a) shows a burst signal, FIG. 5(b) shows an output waveform of the pre-amplifier, FIGS. 5(c) and 5(d) show input and output waveforms of the reset pulse generator circuit, FIG. 5(e) shows output waveforms of the peak holding circuits and FIGS. 5(f) and 5(g) show input and output waveforms of the comparator, respectively.

First, it is assumed that the burst signal shown in FIG. 5(a) is input to the digital optical receiving circuit which is in a waiting state with the holding capacitors of the peak holding circuits being discharged. Further, it should be remembered that the quenching ratio of the burst signal is degraded for the reasons of such as preliminary biasing of a semiconductor laser as a transmission light source to reduce the delay of light emission of the semiconductor laser. The assumption corresponds to a case where, in order to prevent the light emission with degraded quenching ratio from affecting other burst signals, the light emission is cut off on a transmitter side in other time than a time in which the burst signal exists.

When such optical signal $S_a$ is input to the opto-electric conversion element 1, the optical signal is amplified to a predetermined level by the pre-amplifier 3. The first signal $S_{bp}$ of the pre-amplifier 3 which is of a positive phase has a level $(+V_L)$ as zero level and a level $[+(V_L+V_S)]$ as peak level and the second signal $S_{bm}$ of the pre-amplifier 3 which is of an inverted phase has a level $(-V_L)$ as zero level and a level $[-(V_L+V_S)]$ as peak level, as shown in FIG. 5(b).

These signals $S_{bp}$ and $S_{bm}$ are held in the first peak holding circuit 51 and the second peak holding circuit 52 of the ATC circuit 5, respectively, resulting in signals $S_{ep}$ and $S_{em}$ shown in FIG. 5(e). Incidentally, when the optical receiving circuit is changed in state from the waiting state to a signal receiving state, the holding capacitor of the second peak holding circuit 52 is discharged once. In this case, it is necessary to hold the inverted phase voltage $(-V_L)$ of the pre-amplifier 3 which corresponds to the zero level of the signal waveform but has a different value. In order to hold such inverted phase voltage, the holding capacitor of the second peak holding circuit 52 of the ATC circuit 5 must be discharged.

The reset signal $R_d$ which is used to discharge the holding capacitor of the second peak holding circuit 52 is generated in a manner described below. The output signal $S_c$ of the level detector 91 becomes logic "1" simultaneously with the reception of the signal $S_a$, as shown in FIG. 5(c). This signal $S_c$ is supplied to the reset pulse generator 92 from which a single pulse $R_d$ shown in FIG. 5(d) is obtained. When the single pulse $R_d$ is input to the reset circuit 93, the latter circuit causes the holding capacitor of the second peak holding circuit 52 to be discharged. Thus, an output signal $S_{ep}$ of the first peak holding circuit 51 is continuously held at the peak level of the signal $S_{bp}$ which is the level $+(V_L+V_S)$ and an output signal $S_{em}$ of the second peak holding circuit 52 is held at the zero level $(-V_L)$ of the signal $S_{bm}$.

The peak hold values $S_{ep}$ and $S_{em}$ and the positive and inverted phase signals $S_{bp}$ and $S_{bm}$ from the pre-amplifier 3 are added in the first adder 58 and the second adder 57, respectively. As a result, logical decision signals $S_{fp}$ and $S_{fm}$ shown in FIG. 5(f) are produced as the output voltages of the ATC circuit 5. When the logical decision signals $S_{fp}$ and $S_{fm}$ are the same in amplitude, the discriminating value $L_s$ becomes a half value of the signal amplitude. The logical decision signals $S_{fp}$ and $S_{fm}$ are compared with the discriminating value by the comparator 7, resulting in a normalized output signal $S_g$ which takes logic "1" or "0" level as shown in FIG. 5(g).

Figure 6:
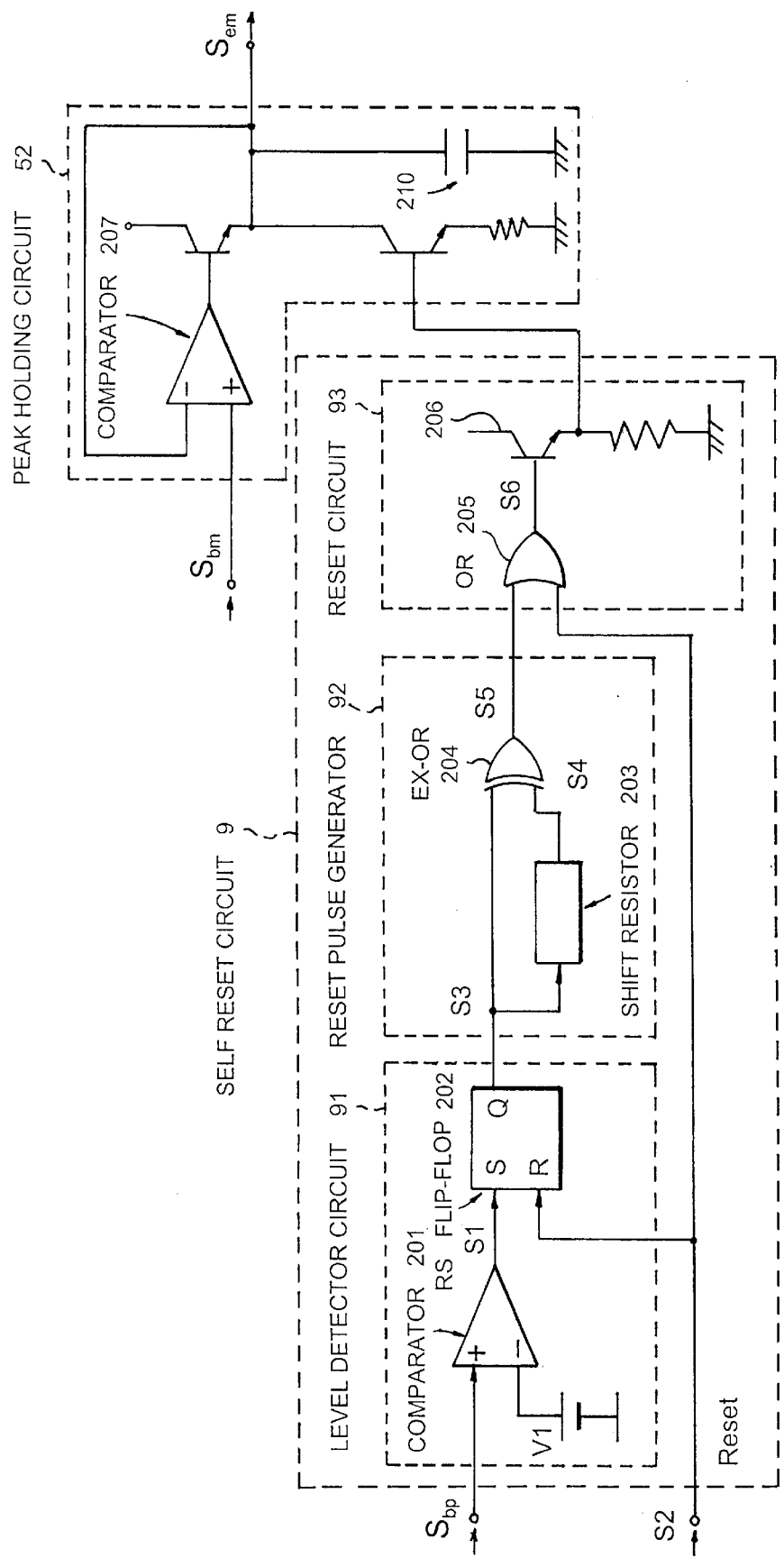
FIG. 6 is a circuit diagram showing an embodiment of a reset circuit in the digital optical receiving circuit according to the present invention.

Returning to FIG. 4, constructions and operations of the self-reset circuit 9 for generating the reset signal and the peak holding circuit 52 will be described with reference to FIG. 6 which shows embodiments of these circuits and FIG. 7 which shows signal waveforms at various portions thereof.

As mentioned previously, the self-reset circuit 9 is constructed with the level detector 91, the reset pulse generator 92 and the reset circuit 93. The level detector 91 is composed of a comparator 201 and an RS flip-flop 202. The output signal of the pre-amplifier 3 shown in FIG. 4 is input to a plus (+) terminal of the comparator 201 and a reference voltage $V_1$ is supplied to a minus (−) terminal thereof.

Figure 7:
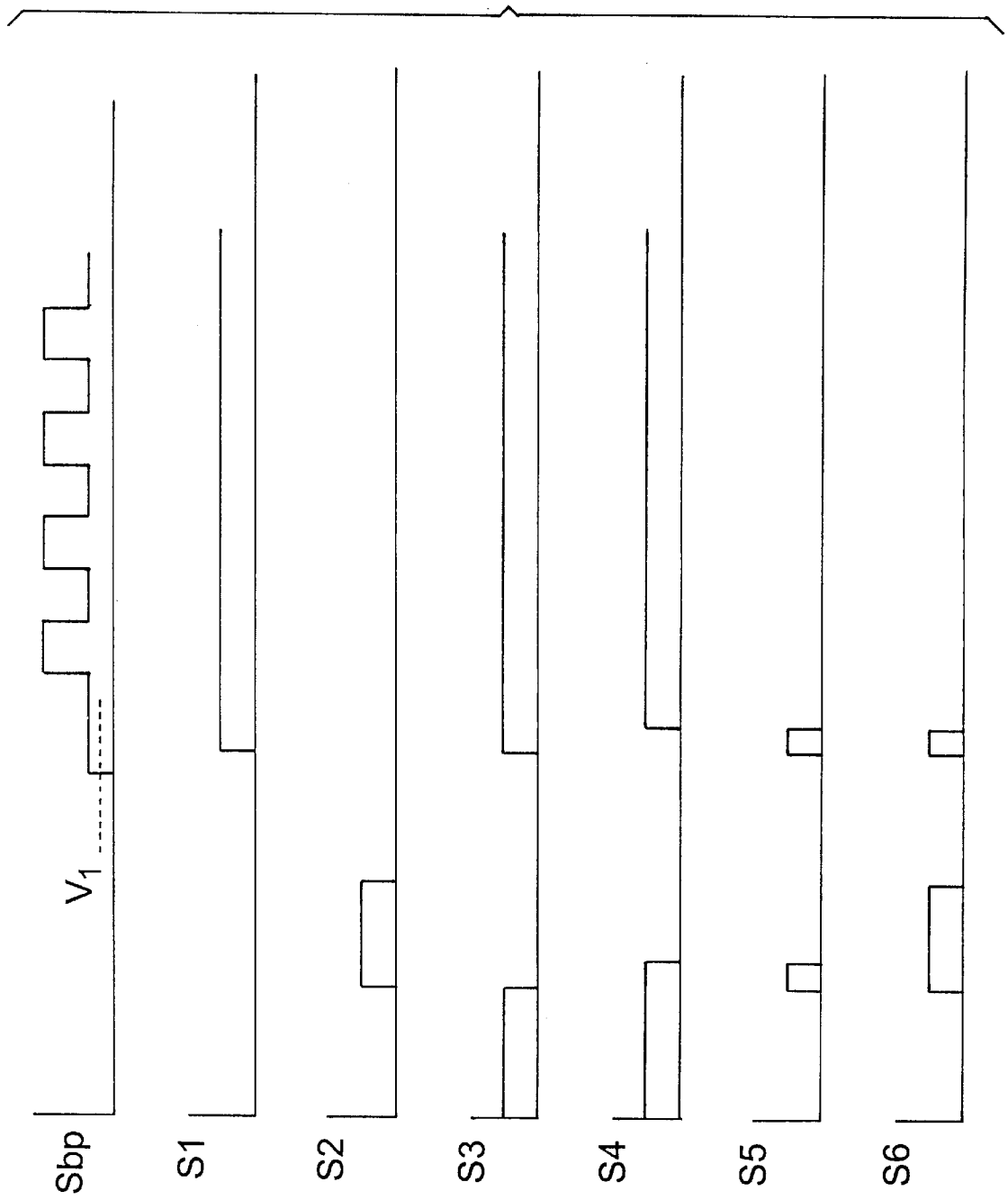
FIG. 7 is a timing chart showing waveforms at various portions of the reset circuit shown in FIG. 6.

Assuming that the pre-amplifier 3 outputs a signal $S_{bp}$ having an offset such as shown in FIG. 7, the comparator 201 outputs a signal waveform S1. The latter signal is supplied to one input of the RS flip-flop 202 and a reset signal S2 is supplied to the other input of the flip-flop 202. The flip-flop 202 outputs a signal waveform S3.

The signal S3 is supplied to the reset pulse generator 92 which composed of a delay circuit 203 and an Exclusive-OR circuit 204. The signal S3 is directly supplied to one input of the Exclusive-OR gate 204 and indirectly to the other input thereof through the delay circuit 203 as a signal S4 which is delayed from the signal S3 by a constant time. In response to the signals S3 and S4, the Exclusive-OR gate 204 outputs a pulse signal S5.

The pulse signals S2 and S5 are ORed by an OR circuit 205 of the reset circuit 93, resulting in a signal S6 which is supplied to a base of a transistor 206 of the reset circuit 93. An output of the transistor 206, that is, an output of the reset circuit 93, is supplied to the peak holding circuit 52 and held in a capacitor 210 thereof by charging the latter with the signal $S_{bm}$ from the pre-amplifier 3. As shown in FIG. 6, the peak holding circuit 52 is composed of a comparator 207 and the capacitor 210, etc., and the charge of the capacitor 210 is discharged in response to the reset signal S6. Of course, the self-reset circuit 9 and the peak holding circuit 52 may be constructed in any of other known circuit constructions, respectively.

According to this embodiment, the peak holding circuits hold the level of logic "1" or "0" of the signal exactly. Therefore, the degradation of duty cycle of the output waveform and the reduction of the output signal amplitude due to offset of the input signal and/or the pre-amplifier are minimized. Further, there are no degradation of system margin, no increase of jitter of the extracted clock and no degradation of the pull-in characteristics. Further, since the reduction of the output signal amplitude is minimized, there is substantially no degradation of the minimum receiving level and no reduction of the dynamic range in which optical signals are receivable.

As described hereinbefore, according to the digital optical receiving circuit of the present invention, in which the peak hold circuits can hold the level of logic "1" and "0" of the signal exactly, the degradation of duty cycle of the output waveform and the reduction of the output signal amplitude due to offset of the input signal and/or the pre-amplifier are minimized. Further, there are no degradation of system margin, no increase of jitter of the extracted clock and no degradation of the pull-in characteristics.

Further, since the reduction of the output signal amplitude is minimized, there is substantially no degradation of the minimum receiving level and no reduction of the dynamic range in which optical signals are receivable. Further, the peak value of the signal from the pre-amplifier is reliably held in the second peak holding circuit of the automatic threshold control circuit and can reliably discharge the holding capacitor of the second peak holding circuit, resulting in an exact peak holding characteristics.

Since the reduction of the output signal amplitude, there is neither the degradation of minimum receiving level nor the reduction of the dynamic range.

While the present invention has been described in connection with certain preferred embodiments, it is to be understood that the subject matter encompassed by way of the present invention is not to be limited to those specific embodiments. On the contrary, it is intended for the subject matter of the present invention to include all alternatives, modifications and equivalents as can be included within the spirit and scope of the following claims.

What is claimed is:

1. A digital optical receiving circuit comprising:
   an opto-electric conversion element for converting an optical signal into an electric signal;
   a differential type pre-amplifier for amplifying the electric signal output from said opto-electric conversion element to a predetermined level and outputting a first signal and a second signal;
   an automatic threshold control circuit for producing a first logical decision signal and a second logical decision signal, the first and second logical decision signals having an intermediate value between amplitude values of the first and second signals from said differential type pre-amplifier;
   a comparator for producing a logic signal on the basis of the first and second logical decision signal; and
   a self-reset circuit for resetting a peak holding capacitor of said automatic threshold control circuit on the basis of the first or second signal;
   wherein said automatic threshold control circuit comprises:
      a first peak holding circuit for holding a peak value of the first signal of positive phase from said differential type pre-amplifier;
      a second peak holding circuit for holding a peak value of the second signal of inverted phase from said differential type pre-amplifier;
      a first adder for producing said first logical decision signal by adding the first signal of positive phase from said differential type pre-amplifier and an output signal of said second peak holding circuit; and
      a second adder for producing said second logical decision signal by adding the second signal of inverted phase from said differential type pre-amplifier and an output signal of said first peak holding circuit.

2. A digital optical receiving circuit comprising:
   an opto-electric conversion element for converting an optical signal into an electric signal;
   a differential type pre-amplifier for amplifying the electric signal output from said opto-electric conversion element to a predetermined level and outputting a first signal and a second signal;
   an automatic threshold control circuit for producing a first logical decision signal and a second logical decision signal, the first and second logical decision signals having an intermediate value between amplitude values of the first and second signals from said differential type pre-amplifier;
   a first comparator for producing a logic signal on the basis of the first and second logical decision signal; and
   a self-reset circuit for resetting a peak holding capacitor of said automatic threshold control circuit on the basis of the first or second signal;
   wherein said self-reset circuit comprises:
      a level detector circuit for detecting that a level of at least one of the first and second signals from said differential type pre-amplifier is equal to or higher than a predetermined level;
      a reset pulse generator for generating a reset pulse on the basis of an output signal of said level detector circuit; and
      a reset circuit for discharging a holding capacity of said second peak holding circuit of said automatic threshold circuit on the basis of the reset pulse from said reset pulse generator; and
   wherein said level detector circuit comprises:
      a second comparator for comparing the first or second signal from said differential type pre-amplifier with a reference voltage and outputting a comparison signal; and
      an RS flip-flop having inputs for receiving the comparison signal and a reset signal.

3. A digital optical receiving circuit comprising:
   an opto-electric conversion element for converting an optical signal into an electric signal;
   a differential type pre-amplifier for amplifying the electric signal output from said opto-electric conversion element to a predetermined level and outputting a first signal and a second signal;
   an automatic threshold control circuit for producing a first logical decision signal and a second logical decision signal, the first and second logical decision signals having an intermediate value between amplitude values of the first and second signals from said differential type pre-amplifier;
   a first comparator for producing a logic signal on the basis of the first and second logical decision signal; and
   a self-reset circuit for resetting a peak holding capacitor of said automatic threshold control circuit on the basis of the first or second signal;
   wherein said self-reset circuit comprises:
      a level detector circuit for detecting that a level of at least one of the first and second signals from said differential type pre-amplifier is equal to or higher than a predetermined level;
      a reset pulse generator for generating a reset pulse on the basis of an output signal of said level detector circuit; and
      a reset circuit for discharging a holding capacity of said second peak holding circuit of said automatic threshold circuit on the basis of the reset pulse from said reset pulse generator; and
   wherein said reset circuit comprises:
      an OR circuit for outputting a resetting signal by obtaining a logical sum of the reset pulse and a reset signal; and a drive circuit for enhancing a driving power of the resetting signal.

4. The digital optical receiving circuit claimed in claim 1, wherein said second peak holding circuit comprises:

a differential amplifier having a first input terminal supplied with the first or second signal output from said differential type pre-amplifier;

a capacitor having one end connected to an output of said differential amplifier and the other terminal connected to ground;

resetting signal input means provided between said output of said differential amplifier and said capacitor for inputting a resetting signal; and feedback connection means connected between said output of said differential amplifier and said second input terminal of said differential amplifier for providing a feedback loop.

5. A digital optical receiving circuit comprising:

an opto-electric conversion element for converting an optical signal into an electric signal;

a differential type pre-amplifier for amplifying the electric signal output from said opto-electric conversion element to a predetermined level and outputting a first signal and a second signal;

a first peak holding circuit for holding a peak value of the first signal;

a second peak holding circuit for holding a peak value of the second signal;

an automatic threshold control circuit including a first adder for producing a first logical decision signal by adding the first signal and an output signal of said second peak holding circuit and a second adder for producing a second logical decision signal by adding the second signal and an output signal of said first peak holding circuit;

a comparator for producing a logic signal on the basis of the first and second logical decision signal;

a self-reset circuit for discharging a holding capacity of said second peak holding circuit.

6. The digital optical receiving circuit claimed in claim 5, wherein said first adder includes:

a first resistor having one end connected to an output of said second peak holding circuit; and a second resistor having one end connected to one of output terminals of said differential type pre-amplifier, the other ends of said first and second resistors being connected to one of input terminals of said comparator, and wherein said second adder includes:

a third resistor having one end connected to an output of said first peak holding circuit; and a fourth resistor having one end connected to the other output terminal of said differential type pre-amplifier, the other ends of said third and fourth resistors being connected to the other input terminals of said comparator.

7. The digital optical receiving circuit claimed in claim 5, wherein said automatic threshold control circuit comprises:

a first peak holding circuit for holding a peak value of a first signal of a positive phase from said differential type pre-amplifier;

a second peak holding circuit for holding a peak value of a second signal of an inverted phase from said differential type pre-amplifier;

a first adder for obtaining a first logical decision signal by adding the first signal of the positive phase from said differential type pre-amplifier and an output signal of said second peak holding circuit; and a second adder for obtaining a second logical decision signal by adding the second signal of the inverted phase from said differential type pre-amplifier and an output signal of said first peak holding circuit.

8. The digital optical receiving circuit claimed in claim 5, wherein said self-reset circuit comprises:

a level detector circuit for detecting that a level of at least one of the first and second signals from said differential type pre-amplifier is equal to or higher than a predetermined level;

a reset pulse generator for generating a reset pulse on the basis of an output signal of said level detector circuit; and a reset circuit for discharging a holding capacity of said second peak holding circuit of said automatic threshold control circuit.

9. The digital optical receiving circuit claimed in claim 5, wherein said self-reset circuit includes a level detector which comprises:

a comparator for comparing the first or second signal from said differential type pre-amplifier with a reference voltage and outputting a comparison signal; and an RS flip-flop having inputs for receiving the comparison signal and the reset signal.

10. The digital optical receiving circuit claimed in claim 5, wherein said self-reset circuit includes a reset pulse generator which comprises:

a delay circuit for outputting a delayed signal by delaying an output of a level detector which receives one of said first and second signals; and an Exclusive-OR circuit for outputting a pulse signal by Exclusive-ORing the output of said level detector and the delayed signal.

11. The digital optical receiving circuit claimed in claim 5, wherein said reset circuit comprises:

an OR circuit for outputting a resetting signal by obtaining a logical sum of the pulse signal and the reset signal; and a drive circuit for enhancing a driving power of the resetting signal.

12. The digital optical receiving circuit claimed in claim 5, wherein said second peak holding circuit comprises:

a differential amplifier having a first input terminal supplied with the first or second signal output from said differential type pre-amplifier;

a capacitor having one end connected to an output of said differential amplifier and the other terminal connected to ground;

resetting signal input means provided between said output of said differential amplifier and said capacitor for inputting the resetting signal; and feedback connection means connected between said output of said differential amplifier and said second input terminal of said differential amplifier for providing a feedback loop.

* * * * *